United States Patent [19]

Asai

[11] Patent Number: 4,971,548
[45] Date of Patent: Nov. 20, 1990

[54] INJECTION MOLDING HALVES FOR DISKS

[75] Inventor: Ikuo Asai, Ohbu, Japan

[73] Assignee: Meiki Company, Ltd., Ohbu, Japan

[21] Appl. No.: 272,218

[22] Filed: Nov. 16, 1988

[30] Foreign Application Priority Data

Sep. 1, 1988 [JP] Japan ................... 63-219284

[51] Int. Cl.$^5$ .............................. B29C 45/32
[52] U.S. Cl. ................ 425/588; 264/328.8;
425/589; 425/595; 425/810
[58] Field of Search ............... 425/810, 552, 553, 569,
425/570, 572, 589, 595, 549, 588, 556;
264/328.8

[56] References Cited

U.S. PATENT DOCUMENTS 3,315,302  4/1967  Phillipson ..................... 425/810
4,737,096  4/1988  Poorten ........................ 425/810
4,786,246  11/1988 Gellert ......................... 425/570

*Primary Examiner*—Jay H. Woo
*Assistant Examiner*—Timothy W. Heitbrink
*Attorney, Agent, or Firm*—Browdy and Neimark

[57] ABSTRACT

Injection molding halves for forming disks having a plurality of cavities between a stationary mold unit, in which a plurality of sprue bushings and a runner with gates for introducing molten resin into said plurality of cavities are provided, and a movable mold unit in which a plurality of punches are provided concentrically to the sprue bushings for severing a central aperture of the molded disk, and an interval mechanism for providing a predetermined interval between a stationary mold unit and stationary mold base plate to ease the removal of escaped material, and connecting structure for connecting the stationary mold unit and the stationary mold base plate by alternative rotating of a connecting rod.

1 Claim, 3 Drawing Sheets

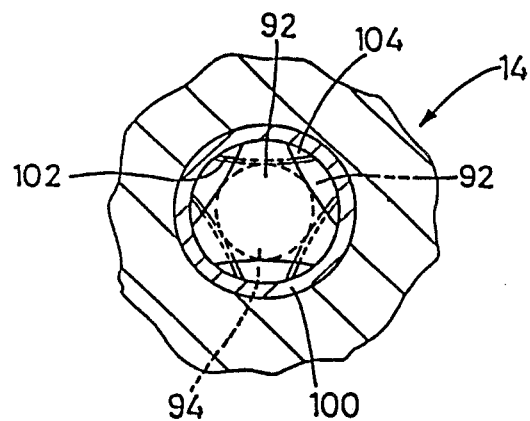
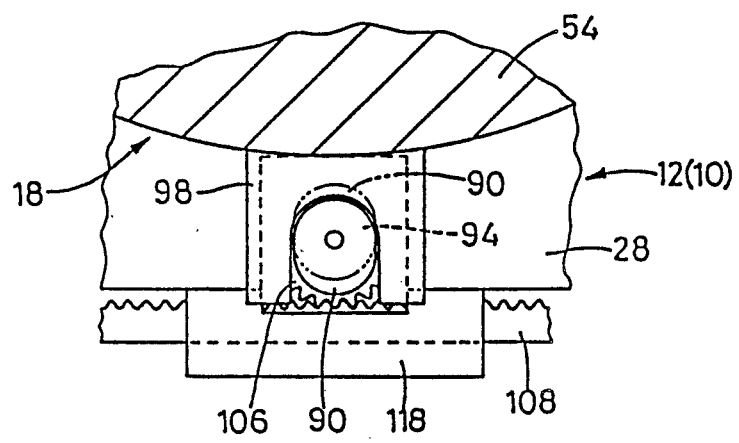

INJECTION MOLDING HALVES FOR DISKS

FIELD OF THE INVENTION

The present invention relates to injection molding die halves within which optical disks or the like are molded, particularly by which a plurality of disks can be molded simultaneously.

BACKGROUND OF THE INVENTION

Generally injection molding halves for the molding of optical disks provide a cavity located between a movable mold half and a stationary mold half with which a sprue bushing is provided, in order to mold the optical disks by injecting molten resin into the cavity through the sprue bushing. Such apparatus also provides a punch associated with the movable mold half concentric to the sprue bushings to sever a central aperture of the molded disks by forward motion of the punch.

As such injection molding halves for molding optical disks in the prior art are composed of but a single cavity, there are limits in improvements of productivity possible. But there exists difficulty in carrying out injection molding with a plurality of cavities formed between the stationary mold half and movable mold half, that is, molten resin has to flow into plural cavities through plural sprue bushings which are provided in the stationary mold half and connected to a passage provided with the stationary mold base plate, and moreover each of central apertures of a plurality of the disks molded in the respective cavities has to be severed by forwarding of each punch provided with the movable mold half.

In such mold halves, the construction becomes overly complicated as each front portion of the sprue bushings is forwarded to a predetermined position while injecting molten resin in order to make the gate annular in the center of the each cavity and is retracted according to the forwarding motion of each punch when severing the central aperture of the disk.

SUMMARY OF THE INVENTION

An object of the invention is to provide injection molding halves for molding disks provided with more simple construction and mechanism which realizes simultaneously injection molding of a plurality of disks without the necessity of providing a complicated operating mechanism for each sprue bushing individually.

This object is accomplished by providing injection molding halves for disks which halves contain a plurality of cavities located between a stationary mold unit fixed on a stationary mold base plate and a movable mold unit fixed on a movable mold base plate, a plurality of sprue bushings fixed in the stationary mold unit and a runner with gates in order to introduce molten resin respectively into a plurality of cavities, and a plurality of punches provided with the movable mold unit located concentrically to the plurality of sprue bushings in order to sever a central aperture of the molded disks in each cavity, comprising; interval means which locates the stationary mold unit leave a predetermined interval from the stationary mold base plate, or closes it, a plurality of the sprue bushings which are forced ceaselessly to contact a plurality of hot tip nozzles provided in the stationary mold base plate by resilient means in order to connect closely a channel for molten resin provided in the stationary mold base plate to respective inner holes of the sprue bushings provided with the stationary mold unit a plurality of punches which operate correspondingly to the operation of the interval means. And it is preferable in the above interval means to open and close the interval between the stationary mold base plate and the stationary mold unit by means of reciprocating motion of each piston rod of a plurality of hydraulic cylinders provided in the stationary mold base plate.

Moreover, when the means of the hydraulic cylinder are adopted, it is preferable as interval means for alternative connecting of the stationary mold unit to the stationary mold base plate or movable mold unit that a plurality of connecting rods be supported rotatably on the stationary mold unit; and a plurality of the pinions which gear with a plurality of racks provided with a traverse bar, be provided with each of the connecting rods in order to connect an end portion of each connecting rod to the front portion of the each piston rod or other portion of each of the connecting rods to the movable mold unit alternatively and simultaneously by reciprocating of the traverse bar.

The invention provides function that an annular gate is formed in each cavity by both of the interval means to close the interval between the stationary mold base plate and the stationary mold unit and the resilient means to push the sprue bushings to the direction of the stationary mold base plate, and each aperture in the central portion of each disk is severed by forwarding of each punch which is permitted by leaving the interval between the stationary mold base plate and the stationary mold unit in order to enable the sprue bushing to retract.

According to the invention construction of the mold halves is more simple in comparison with mold halves of the prior art which are provided with complicated driving mechanism for forwarding and retracting of each sprue bushing, because the invention can sever central aperture of each disk by providing interval mean and the resilient means. Also the construction of the inventor is convenient for cleaning of faces between the stationary mold base plate and the stationary mold unit, because the stationary mold unit can separate from the stationary mold base plate and simultaneously connect the stationary mold unit to the movable mold unit to enable space between the stationary mold base plate and the stationary mold' unit to open widely in accordance with opening motion of the movable mold base plate by rotation of the connecting rods which causes the stationary mold unit to connect or release alternatively to the stationary mold unit or the movable mold unit. Moreover it is an additional advantage to connect or release easily the stationary mold unit to the stationary mold base plate or the movable mold unit easily by means of the reciprocating of the traverse bar provided with a plurality of racks which causes each of the connecting rods to rotate simultaneously.

BRIEF DESCRIPTION OF THE DRAWINGS

FIG. 2 is II—II sectional view of FIG. 1; and

FIG. 3 is III—III sectional view of FIG. 1.

DETAILED DESCRIPTION OF PREFERRED EMBODIMENTS

Figure 1:
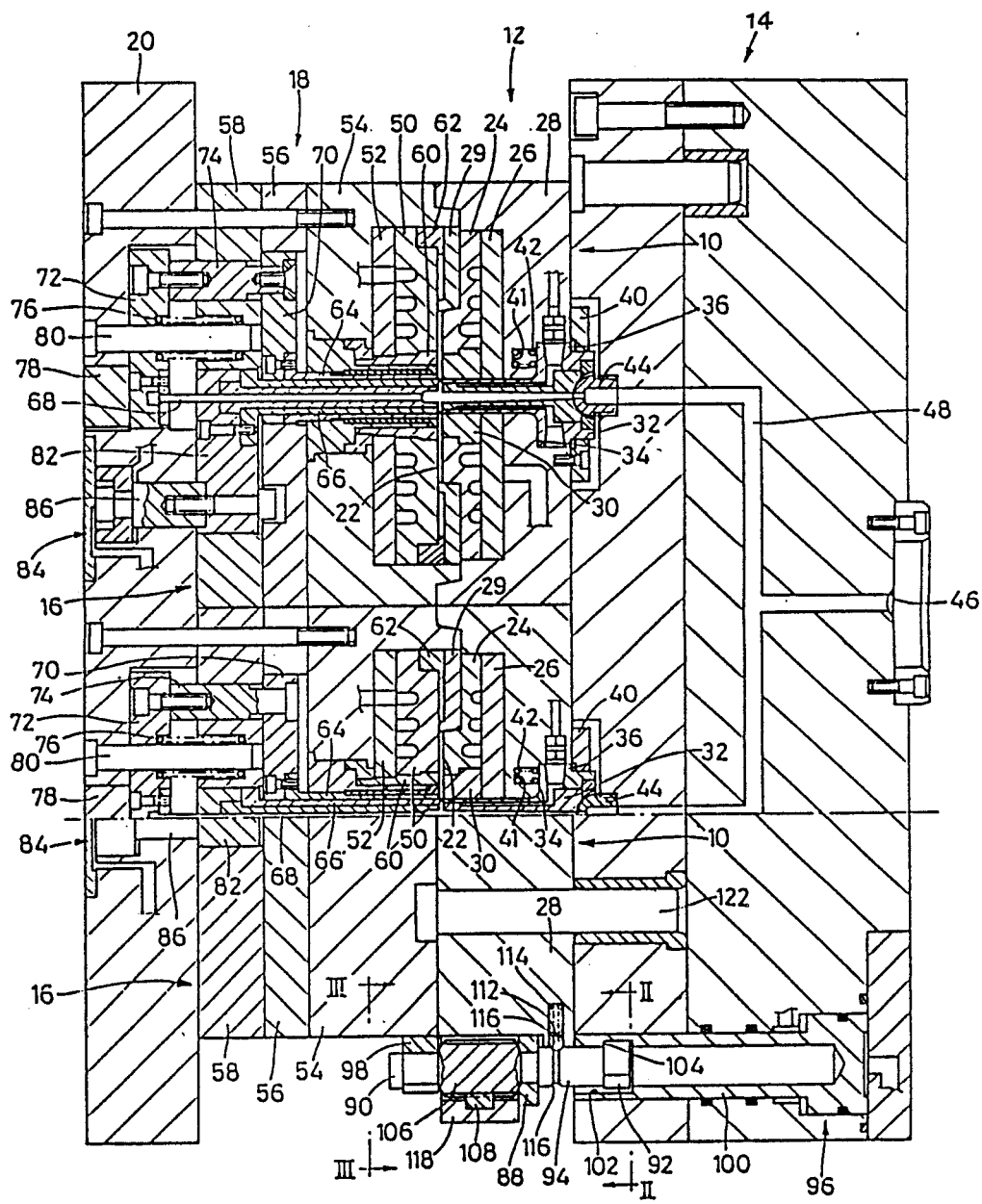
FIG. 1 is a sectional view to explain an embodiment of the injection molding halves of the invention.

FIG. 1 shows a cross sectional view of the injection molding halves of the invention for molding disks. In FIG. 1, a stationary mold unit 12 includes two stationary mold block units 10, and a movable mold unit 18 includes two movable mold block units 16 which are fixed to a movable mold base plate 20 positioned face to face to the stationary mold block units 10. When the mold halves are brought together, two cavities 22 for disk molding are formed between the stationary mold block unit 10 and the movable mold block unit 16. There are provided a mirror plate 24 and a back up plate 26 in the concave portion of each block plate 28. An annular plate 29 has an inner periphery which defines the outer periphery of the cavity 22 at the outer edge of the convex part of the mirror plate 24. A die block 30 is provided concentrically with the center portion of each mirror plate 24. A first end portion of a sprue bushing 32 is movably put in the center hole of each dieblock 30, and a second large diameter end portion 36 of the sprue bushing 32 is movably put in a concave portion 34 provided in each block plate 28. The sprue bushing 32 can be reciprocated between a position in which a lower face of the large diameter end portion 36 touches the bottom face of the concave portion 34 and a position in which an upper face of it touches a stopper flange 40. The sprue bushing 32 provides a cooling channel and is supported resiliently by a plurality of springs 41, 42 placed in each hollow within each block plate 28. There is provided an air passage between the outer periphery of each die block 30 and the inner periphery of each mirror plate 24. Two hot tip nozzles 44 of spherical convex outer shape are provided in the stationary mold base platen 14 and the exterior of each hot tip nozzle 44 is closely received in a spherical concavity of each sprue bushing 32 due to the action of the springs 42 on the sprue bushing 32.

A divergent passage 48 for molten resin is provided in the stationary mold base plate 14. Two end portions of the divergent passage 48 are connected respectively to each hot tip nozzle 44 and the opposite end is connected to an inlet 46.

Two block plates 54 are fixed to the movable mold base plate 20 with the interposition of each intermediate block plate 56 and rear block plate 58. There are fixed a mirror plate 50 and back up plate 52 in the concave portion of each block plate 54. An inner stamper holder 60 for the inner periphery of a stamper (not shown in the drawing) is provided concentrically through a center hole of each mirror plate 50. An outer stamper holder 62 is provided concentrically with the outer periphery of each mirror plate 50. A stamper in which suitable informational indicia are embossed is held on the surface of each mirror plate 50 by the inner stamper holder 60 and the outer stamper holder 62. An ejector sleeve 64 is placed movably in the inside of each inner stamper holder 60. A punch 66 which reciprocates on the same axis as the center axis of each sprue bushing 32 is placed concentrically on the inside of each ejector sleeve 64. An ejector pin 68 is in turn concentrically movably located in the inside of the each punch 66. The rear end of each ejector sleeve 64 is fixed to each ejector sleeve plate 70 and the rear end of each ejector pin 68 is fixed to each ejector pin plate 72. Each ejector sleeve plate 70 is connected to each ejector pin plate 68 by each connecting rod 74. A plurality of springs 76 are provided between the rear block plate 58 and the ejector pin plate 72 in order to retract the front end surface of the each ejector pin 68 and each ejector sleeve 64 from the surface of each cavity 22. A plurality of guide rods 80 is fixed to the movable mold base plate 20 in its rear portion. Each spring 76 is put in the outer periphery of each guide rod 80. The rear end portion of each punch 66 is fixed to its respective punch supporting plate 82 which is connected to its respective piston rod 86. A plurality of hydraulic cylinders 84 for severing the center aperture of molded disk in which the piston rod 86 is put, is fixed to the movable mold base plate 20.

Two connecting rods 94 are rotatably supported by respective brackets 88 fixed on the block plate 28. A connecting means 90 and 92 are provided with both end portions of the respective connecting rod 94. Two hydraulic cylinders 96 in which each piston rod 100 is put respectively, are provided with the stationary mold base plate 14. There are provided connected means 104 which are fastened to the connecting means 92 with the concave portion 102 in the end portion of the each piston rod 100 as shown in FIG. 2.

A connecting bracket 98 to which the connecting means 90 of the each connecting rod 94 is fastened, is fixed on the block plate 54. Each of the connecting means 90 and 92 is fastened alternatively to either the connecting bracket 98 or the connected means 104 due to the rotating of the each connecting rod 94 at an angle of 180°. Due to above mentioned rotating, the stationary mold unit 12 is connected to the stationary mold base plate 14 or alternatively, to the movable mold unit 18. When the stationary mold unit 12 is connected to the movable mold unit 18, retracting of the movable mold unit 20 can keep sufficiently wide spacing between the stationary mold base plate 14 and the stationary mold unit 12.

Figure 4:
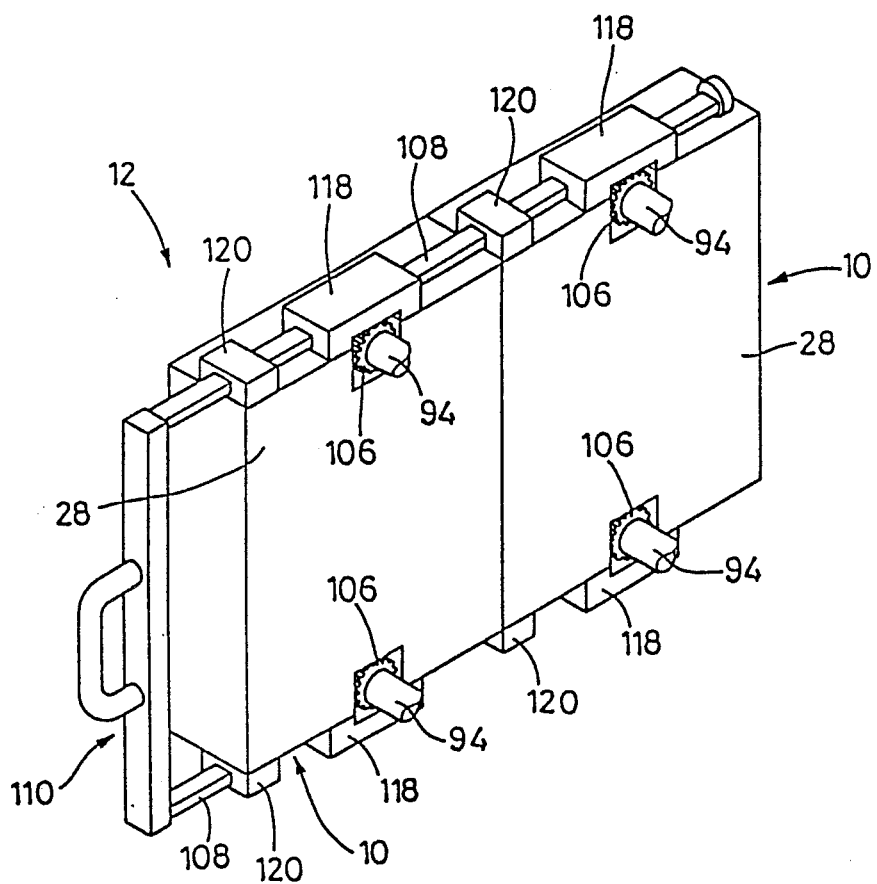
FIG. 4 is a perspective view to explain the mechanism of the rack and traverse bar in the FIG. 1.

As shown in FIGS. 1, 3 and 4, each pinion 106, provided with the two connecting rods 94, gears a pair of racks 108 provided in parallel. Each end of racks 108 is fixed by a traverse bar 110. The connected means 104 is rotated by rotation of the pinion 106 which in turn is caused to rotate by reciprocation of the rack 108. Operation of the traverse bar 110 causes rotating of the connecting rod 94. A ball 112 is provided in the groove on the outer periphery of the each connecting rod 94 as shown in FIG. 1. There are two concave portions 116 in the groove. The ball 112 is pushed to either of concave portions 116 by a spring 114 to keep the position for alternative fastening of the connecting rod 94 to either of connecting bracket 98 or connected means 104. A main guide bracket 118 and a sub guide bracket 120 are provided with each block plate 28 for guiding movement of the each rack 108 as shown in FIG. 1, 3 and 4. There is fixed a plurality of guide pins 122 with the block plate 28 for positioning the stationary mold unit 12 to the stationary mold base plate 14.

When a disk is molded by the mold halves of the invention, each connecting means 92 of the connecting rods 94 are connected with the each connected means 104 provided with its respective piston rod 100 of the hydraulic cylinder 96 by operation of the traverse bar 118 to fix the block plate 28 of the stationary mold unit 12 to the stationary mold base plate 14 by retracting of the piston rod 100. After the movable mold unit 18 is clamped to the stationary mold unit 12, molten resin is injected into the cavities 22 through each sprue bushing 32 and the diverged passage 48. Each sprue bushing 32 is pushed to its respective hot tip nozzle 44 against the resilient force of the spring 42 to form an annular gate between both end faces of each punch 66 and sprue bushing 32. After completion of resin filling, each punch 66 moves forwards to sever the central aperture of its respective molded disk by operation of the hydraulic cylinders 84 and 96 as soon as the stationary mold unit 12 is separated from the stationary mold base plate 14. The above-mentioned separating operation permits retracting of each sprue bushing 32 to the stationary mold base plate 14 corresponding to forwarding of the respective punch 66.

In the illustrated embodiment of the invention, there is provided an electrical sequence circuit for corresponding operation between the operation of the hydraulic cylinders 84 for forwarding of each punch 66 and the operation of the hydraulic cylinder 96 for causing the predetermining interval between the stationary mold unit 12 and the stationary mold base plate 14. When the movable mold unit 18 is retracted from the stationary mold unit 12 to take out the molded disk after severing of central aperture of the disk by the punch 66, each molded disk with an aperture and sprue are ejected respectively by an ejector sleeve 64 and an ejector pin 68.

And then the above described molding cycle is repeated. When cleaning of contact surface between the hot tip nozzles 44 and the sprue bushings 32 becomes necessary, the traverse bar 110 is operated by hand so that the surface of the stationary mold unit 12 is in contact with the surface of the movable mold unit 18. Displacement of the traverse bar 110 causes each connecting rod 94 rotate at an angle of 180° to release connecting between the connecting means 92 of the each connecting rod 94 and the connected means 104 of the each piston rod 100, and on the other hand to connect the connecting means 90 of each connecting rod 94 to its respective connecting bracket 98 on the movable mold unit 18. When the movable mold base plate 20 is retracted after above mentioned displacement of the traverse bar 110, space enough to clean is created between the stationary mold unit 12 and the stationary mold base plate 14.

As mentioned above, the injection molding halves of the invention can keep the end face of the sprue bushing 32 in the predetermined position of the each cavity 22 while injecting molten plastic without providing such complicated construction as in the prior art; a plurality of sprue bushings 32 are thus reciprocably provided with each cavity 22 and can sever the central aperture of the disk with forwarding of the punch 66 corresponding to the retracting of the sprue bushing 32. And also the injection molding halves of the invention can clean the contact face between the sprue bushing 32 and the hot tip nozzle 44 periodically or at any required time, by simple of operating the traverse bar 110 for causing of simultaneous rotating of the each connecting rod 94.

The embodiment of the invention specifically described and illustrated herein is exemplary only, and is not intended to limit the scope of the invention, which is to be interpreted in the light of the prior art and appended claims only with due consideration for the doctrine of equivalents. For example, the embodiment of the invention shows the injection molding halves for two cavities, but it is possible to provide for more than three cavities. Moreover it is possible to adopt an interval means to substitute for the hydraulic cylinder 96 as means for separating the stationary mold unit 12 from the stationary mold base plate 14.

The invention promotes productivity of injection molding for a plurality of disks with a simple construction without providing an reciprocating mechanism to respective sprue bushing. And the invention has provision for easy cleaning of resin passages in the mold for a plurality of disks by means of providing a plurality of hydraulic cylinders in which each piston rod provides connecting means, a plurality of connecting brackets which is fixed on the block plate, a plurality of connecting rods which connects the piston rod or the connecting bracket alternatively by rotating and the traverse bar which rotates the connecting rod.

What is claimed is:

1. Injection molding halves for forming disks comprising a plurality of cavities formed between a stationary mold unit fixed on a stationary mold base plate and a movable mold unit fixed on a movable mold base plate, a plurality of sprue bushings fixed in the stationary mold unit, a runner in the stationary mold unit with gates for introducing molten resin into said plurality of cavities, and a plurality of punches provided with the movable mold unit concentrically to said plurality of sprue bushings for severing a central aperture of the molded disk in each cavity, interval means for providing a predetermined interval between the stationary mold base plate and the stationary mold unit and for closing said predetermined interval, each of said sprue bushings being biased against a hot tip nozzle on said stationary mold base plate by resilient biasing means in order to closely connect a channel for the passage of molten resin in said mold base plate to respective inner holes of the sprue bushings provided in said stationary mold unit, a plurality of punches which operate in accordance with operation of the interval means; and wherein the interval means comprises;

a plurality of hydraulic cylinders, a plurality of connecting rods of which each connecting rod is set in parallel and supported rotatably on the stationary mold unit, driving means for rotating the connecting rods, said driving means composed of pinion gears provided on the periphery of the connecting rods, said driving means further including racks provided with a traverse bar, and connecting means which connect or release each connecting rod to its respective piston rod of the hydraulic cylinders by rotation of the connecting rod.

* * * * *